United States Patent
Yokoyama

(10) Patent No.: US 8,209,626 B2
(45) Date of Patent: Jun. 26, 2012

(54) DETERMINING REQUEST DESTINATION

(75) Inventor: Satoshi Yokoyama, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 12/528,825

(22) PCT Filed: Mar. 7, 2008

(86) PCT No.: PCT/JP2008/054209
§ 371 (c)(1),
(2), (4) Date: Feb. 16, 2010

(87) PCT Pub. No.: WO2008/111531
PCT Pub. Date: Sep. 18, 2008

(65) Prior Publication Data
US 2010/0153871 A1   Jun. 17, 2010

(30) Foreign Application Priority Data

Mar. 9, 2007   (JP) ................................ 2007-059633

(51) Int. Cl.
*G06F 3/14* (2006.01)
*G06F 3/17* (2006.01)

(52) U.S. Cl. ........ 715/786; 715/200; 715/700; 345/103; 345/421; 345/581; 345/629

(58) Field of Classification Search .......... 715/200–277, 715/700–867; 700/701–866; 709/201–229; 705/50–79; 345/30–111, 421, 582, 629; 348/206–231.9; 707/200–206; 382/103
See application file for complete search history.

(56) References Cited

U.S. PATENT DOCUMENTS

| | | | |
|---|---|---|---|
| 6,470,100 B2 | 10/2002 | Horiuchi | |
| 7,292,256 B2 * | 11/2007 | Lawther et al. | 345/629 |
| 7,400,329 B2 * | 7/2008 | Edwards | 345/581 |
| 2009/0027387 A1 * | 1/2009 | Furuhashi et al. | 345/421 |
| 2009/0147991 A1 * | 6/2009 | Chau | 382/103 |

FOREIGN PATENT DOCUMENTS

| | | | |
|---|---|---|---|
| JP | 7152922 A | 6/1995 | |
| JP | 9054838 A | 2/1997 | |
| JP | 11306375 A | 11/1999 | |
| JP | 2004318227 A | 11/2004 | |

\* cited by examiner

*Primary Examiner* — Ruay Ho
(74) *Attorney, Agent, or Firm* — Brian J. Teague

(57) ABSTRACT

A display system includes a display section; an executing section that executes one or more applications; a plurality of virtual frame buffers each storing image information and transparency information of points on the display screen which are generated by one or more applications; a drawing section for drawing a multilayer image on the display screen by pasting the contents in virtual frame buffers and executing the process of alphablending; a storage section for storing the threshold transparency of each layer; an input section for receiving a position on the display screen from the user as a process request; and a destination determining section for determining, in response to input, whether the transparency at the position is larger than the threshold value of each layer, and determining an application related to a layer for which a positive determination is made as the destination of the request.

25 Claims, 10 Drawing Sheets

FIG. 1
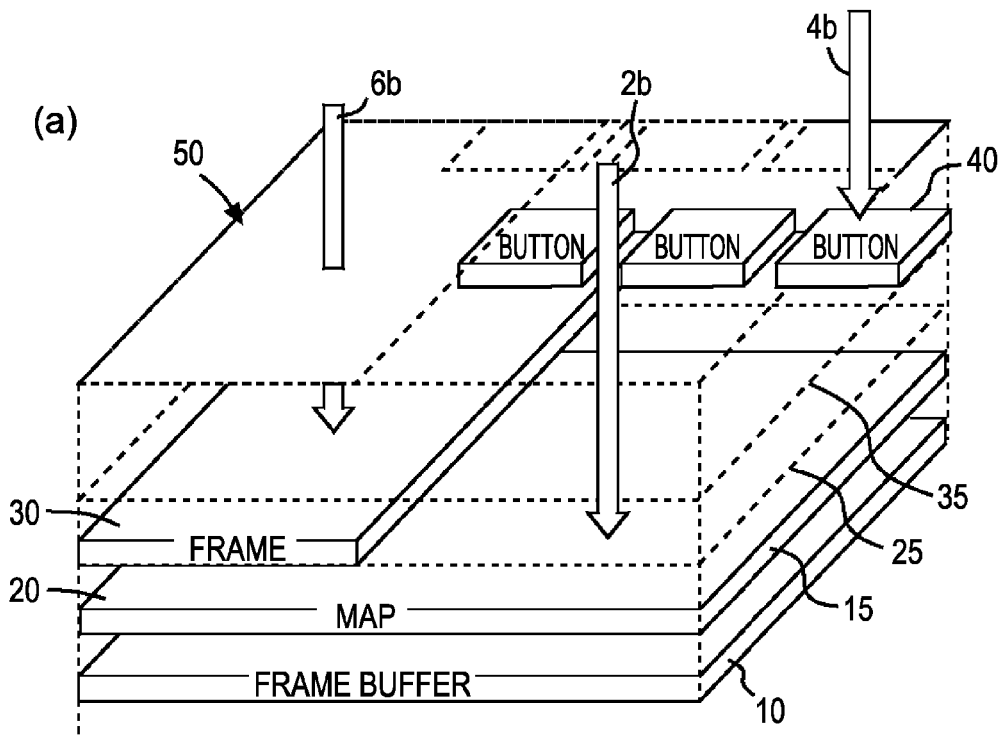
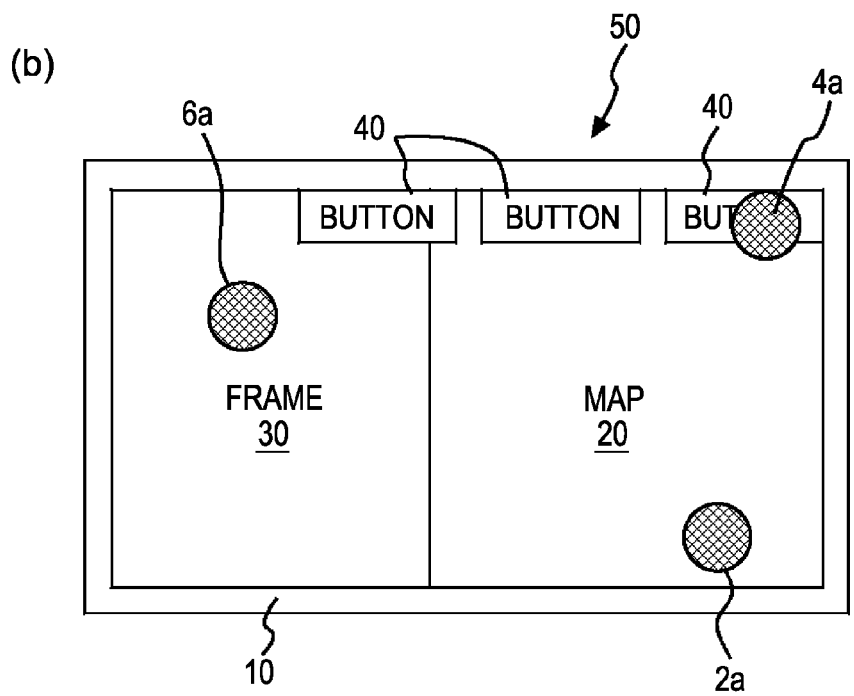

(a)

(b)

| LAYER | THRESHOLD OF ALPHA VALUE | REQUEST DESTINATION | |
|---|---|---|---|
| FIRST LAYER | k(1) | FIRST APPLICATION | |
| | | REGION 1 | FIRST OBJECT |
| | | REGION 2 | SECOND OBJECT |
| SECOND LAYER | k(2) | SECOND APPLICATION | |
| | | THIRD OBJECT | |

(a)

(b)

| LAYER | THRESHOLD OF ALPHA VALUE | REQUEST DESTINATION |
|---|---|---|
| FIRST LAYER | k(1) | FIRST OBJECT |
| SECOND LAYER | k(2) | SECOND OBJECT |

DETERMINING REQUEST DESTINATION

CROSS-REFERENCE TO RELATED APPLICATION

This application is a national phase of and claims priority to International Application No. PCT/JP2008/054209, filed Mar. 7, 2008, which in turn claims priority to Japan Patent Application No. 2007-59633, filed Mar. 9, 2007, the contents of which are incorporated herein by reference in their entirety.

BACKGROUND

The present invention relates to a system for displaying a multilayer image on a screen and, in particular, it relates to a technique for determining a request destination when a user points a position on the screen and makes a process request.

Hitherto, systems for displaying multilayer images are known. Such systems display a plurality of images through alphablending the images according to their respective transparency information and superposing them. The transparency information can be set for each point on the screen. Color information and the transparency information are combined to display one point on the screen. The transparency information set for each point on the screen is called an alpha value, which ranges from 0 (completely transparent) to 1 (opaque).

Problems sometimes occur on a display screen that displays a multilayer image when a user selects an object located in one layer. For example, suppose a semitransparent enlarging or reducing button is displayed on a map. In this case, even if the user clicks on the position of the button with a mouse, the display system cannot determine whether the click operation is for the button or for the map. This makes it difficult to determine the destination of the event indicative the click operation.

A simple solution is preparing an event-only filter for each layer. However, this solution is not practical, because the producer of its application must set the filters in consideration of the arrangement of the layers and the objects.

Another solution is using alpha values such as in a layer window, one of the user interfaces provided by Microsoft Windows® operating systems. The layer window allows mouse messages to pass through regions of an alpha value of zero. However, with the layered window, even a region with a low alpha value always receives a process request unless the alpha value is zero. When a plurality of alpha values other than zero is set for one layer, some regions of low alpha values are not regions selected by the user, so that they should not receive a process request. On the other hand, regions of high alpha values thus having clear images, such as text information, sometimes should not receive a process request.

BRIEF SUMMARY

Embodiments of the present invention provide a display system for displaying a multilayer image in which, when a position on the screen is pointed to and to which a process request is given, a layer to receive the process request can be determined accurately. Embodiments of the present invention also prevent regions that should not receive a process request from receiving the process request even if the region have an alpha value of 1. Embodiments of the present invention also enable using different references from layer to layer to determine whether the region is to receive the process request.

In one embodiment of the invention, a system is provided having a display section, for displaying an image on the display section by computer processing. The system includes a plurality of first buffers each storing a plurality of pieces of image information generated by one or more applications, the image information including drawing information and transparency information of points on the display screen; a drawing section for drawing a multilayer image on the display screen by alphablending the image information in each of the first buffers according to the respective transparency information and by superposing them; a storage section for storing the threshold transparency of each layer; an input section for receiving positional information indicative of a position on the display screen from a user as a process request; and a destination determining section for determining the destination of the request in response to reception of the positional information. The destination determining section determines whether the transparency information at the position indicated by the positional information and in the first buffer corresponding to each of the plurality of layers is larger than the threshold value of each layer, and determines, as the destination of the request, an application related to a layer for which a positive determination is made or an object contained in the application and located in said position on the display screen.

Preferably, the system includes a second buffer for storing image information of the multilayer image to be displayed on the display screen of the display section, and the drawing section generates the multilayer image into the second buffer and draws the multilayer image on the display screen by pasting the image information of the first buffer to a corresponding layer and executing alphablending according to the respective transparency information.

Preferably, the destination determining section executes determination in order from the highest layer, and determines, as the destination of the request, an application related to a layer for which a positive determination is made first or an object contained in the application and located in said position on the display screen.

Preferably, a layer to which no request should be sent has the maximum transparency as the threshold transparency of the layer. The layer to which no request should be sent may be a layer to which text information is to be drawn. As an alternative, the layer to which no request should be sent may be a layer to which traffic information is to be drawn.

Preferably, the system further includes an executing section for executing one or more applications, wherein the destination determining section receives the respective threshold transparencies from one or more applications, and stores the received threshold transparencies in the storage section in association with the corresponding layers. Preferably, the system further includes an executing section for executing one or more applications and an application managing section for managing one or more applications, wherein the application managing section determines the threshold transparencies of the layers and stores the threshold transparencies in the storage section.

While we have described the invention as a system for determining the destination of a request, the invention may be embodied as a car navigation system incorporating the system. The car navigation system further includes a receiving section for receiving information. The executing section of the car navigation system executes one or more applications that provide map information and traffic congestion information based on the information received by the receiving section. The invention can be embodied as a method for determining the destination of a request and a program product having program code for a system for displaying a multilayer image on a screen.

In addition to the method of, as described above, other aspects of the present invention are directed to corresponding systems and computer program products for.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1(a) is a diagram showing an example of the layer structure of a three-layer image; and FIG. 1(b) is a top view of FIG. 1(a).

DETAILED DESCRIPTION

Figure 2:
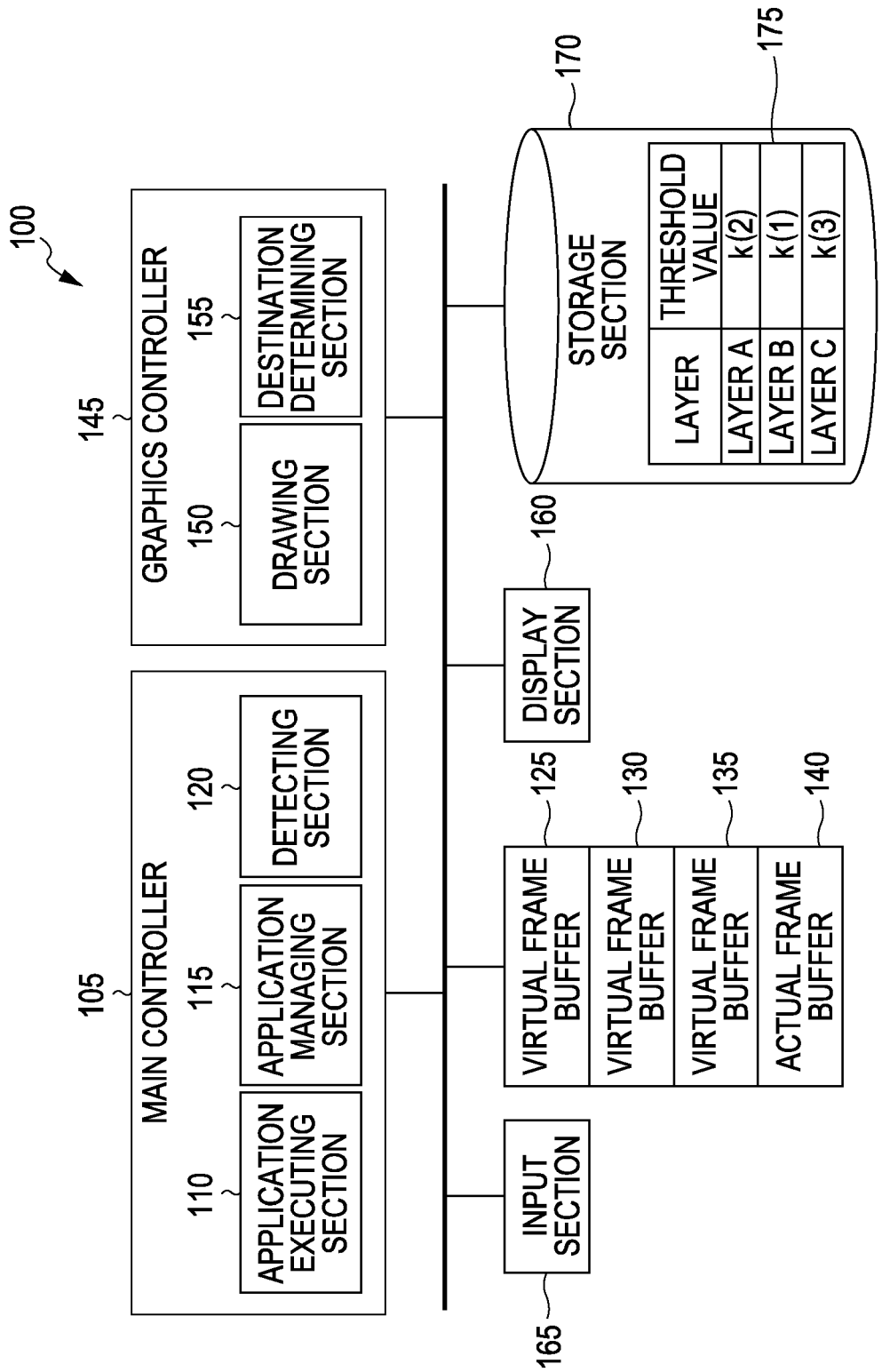
FIG. 2 shows an example of the functional structure of a display system 100 according to an embodiment of the invention.

According to embodiments of the invention, when a position on the screen is pointed and a process request is given in a display system for displaying a multilayer image, a layer to receive a process request can be determined accurately. Regions whose alpha values are not zero and which should not receive the process request can be eliminated from the destination of the request. Furthermore, the reference to determine whether or not to receive the request can be varied from layer to layer.

Embodiments of the invention will be described hereinbelow with reference to the drawings. However, it is to be understood that the following embodiment does not limit the invention according to the claims and that all the combinations of the characteristics described in the embodiment are not absolutely necessary for the solutions of the invention.

Referring first to FIG. 1 before the description of the invention, a problem in selecting an object displayed on the screen in a display system for displaying a multilayer image will be described. FIG. 1(a) shows an example of a multilayer image drawn on a frame buffer 10. The image shown in FIG. 1 includes three layers 15, 25, and 35, to which images of a map 20, a frame 30, and buttons 40 are pasted in order from the lowest layer. FIG. 1(b) is a top view of FIG. 1(a). When the images of FIG. 1(a) are displayed on the display screen, the user can see a top surface 50 as shown in FIG. 1(b).

Suppose that the user selects a point 2a on the map with a pointing device such as a mouse and makes a request for processing. Then the display system can easily determine the destination of the request because there is only a map image at the point 2a, as indicated by the arrow 2b of FIG. 1(a). However, if a point 4a on the button 40 or a point 6a on the frame 30 is selected in the same way, then the display system cannot easily determine the destination of the request because the point 4a and the point 6a are in the regions where a plurality of images is superposed, that is, a map image is displayed under arrows 4b and 6b in FIG. 1(a). The invention solves this problem using transparency information set on each point on the layers and threshold transparency information set for each layer.

FIG. 2 shows an example of the functional structure of a display system 100 according to an embodiment of the invention. The display system 100 includes a main controller 105, virtual frame buffers 125, 130, and 135 serving as first buffers, an actual frame buffer 140 serving as a second buffer, a graphics controller 145 for controlling the entire screen display, a display section 160, an input section 165, and a storage section 170.

The main controller 105 includes an application executing section 110, an application managing section 115, and a detecting section 120. The graphics controller 145 includes a drawing section 150 and a destination determining section 155. The storage section 170 stores threshold transparency information 175 (hereinafter, referred to as alpha values) set for every layer.

The graphics controller 145 may be included in the main controller 105. Although FIG. 2 shows three virtual frame buffers, the number of the virtual frame buffers is not limited to three. The number of the virtual frame buffers is equal to that of the layers, so that the number of the virtual frame buffers depends on the number of layers that constitute a display image. This embodiment will be described for a three-layer image by way of example.

The display section 160 displays images on the display screen. The actual frame buffer 140 stores information on a multilayer image to be displayed on the display screen of the display section 160. As described above, the image in the embodiment has three layers in this example.

The application executing section 110 executes one or more applications. For execution of a plurality of applications, the applications are executed in parallel. A plurality of applications or a plurality of objects contained in one application according to the embodiment sets a threshold alpha value, which serves as a reference in determining the destination of the request, to the destination determining section 155, to be described later, when executed by the application executing section 110. The setting may be made according to an API function provided to the destination determining section 155, for setting a threshold alpha value.

The virtual frame buffers 125, 130, and 135 store a plurality of image information including drawing information and alpha values of the points on the display screen generated by one or more applications, respectively. Either one virtual frame buffer may contain the image information of one or more objects contained in one application (see FIGS. 3(a) and 4(a)) or one virtual frame buffer may contain the image information of a plurality of objects contained in different applications (see FIG. 5(a)).

The application managing section 115 manages execution of the whole one or more applications. One of the processes executed by the application managing section 115 related to the invention is layer setting. The application managing section 115 determines in which layer the image generated by each application is to be disposed. Specifically, the application managing section 115 sets an image to be displayed on the front side to a higher layer, and an image to be displayed at the back to a lower layer. Another process of the application managing section 115 is to set threshold alpha values.

The application managing section 115 sets threshold alpha values to the destination determining section 155 in place of individual applications or objects or to change their setting.

The drawing section 150 pastes the contents of the plurality of virtual frame buffers 125, 130, and 135 to the corresponding layers, executes alphablending according to the respective alpha values, and superposes them to thereby generate a multilayer image in the actual frame buffer 140, thereby drawing it on the display screen of the display section 160. The association between the virtual frame buffers 125, 130, and 135 and the layers is based on the layer setting by the application managing section 115.

The alphablending according to alpha values is executed as follows: an image value G=G2×(1−a1)+G1−a1, where G1 is the image value and a1 is the alpha value of a point on the foreground, and G2 is the image value of the corresponding point on the background. If the number of layers is three or more, the foregoing equation is calculated repeatedly. For example, the foregoing equation is calculated with the highest layer as the foreground and the next layer as the background. The obtained image value is next used as the image value of the foreground. The operation is repeated to the lowest layer. The alpha value takes values ranging from 0 to 1.

The input section 165 receives positional information indicative of a position on the display screen as a process request from the user. Specifically, the input section 165 may be a pointing device such as a touch panel, a cursor-movement key, or a mouse. In the case where the display system 100 is preloaded with audio recognition software, the input section 165 may be a microphone. The detecting section 120 detects the input by the input section 165.

The storage section 170 stores threshold alpha values for determining the destination of the event or request input by the input section 165 for the plurality of layers. As described above, the threshold alpha values are written to the destination determining section 155 by the applications, the objects contained in the application, or the application managing section 115. The destination determining section 155 stores the received threshold alpha values in the storage section 170 in association with the corresponding layers.

In response to the reception of positional information, the destination determining section 155 determines whether the alpha values in the virtual frame buffers corresponding to the layers at the position on the display screen indicated by the positional information are higher than the threshold values of the layers, respectively. Thus, the destination determining section 155 determines an object contained in an application related to a layer for which a positive determination is made or an object contained in the application and disposed in that position as the destination of the request.

The determination of the destination determining section 155 is made in sequence from the highest layer. The destination determining section 155 determines an object contained in an application related to a layer for which a positive determination is made first or an object contained in the application and disposed in that position as the destination of the request.

Figure 3:
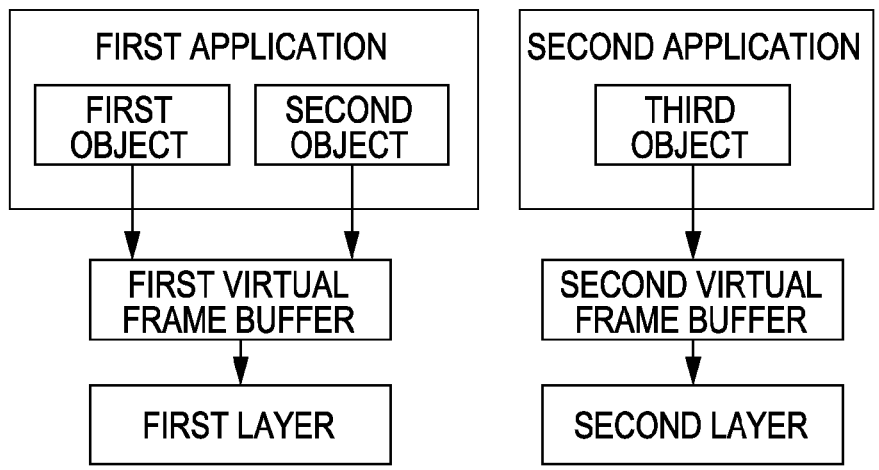
FIG. 3 shows an example of the correlation between applications and layers and a table stored in the storage section 170.
Figure 4:
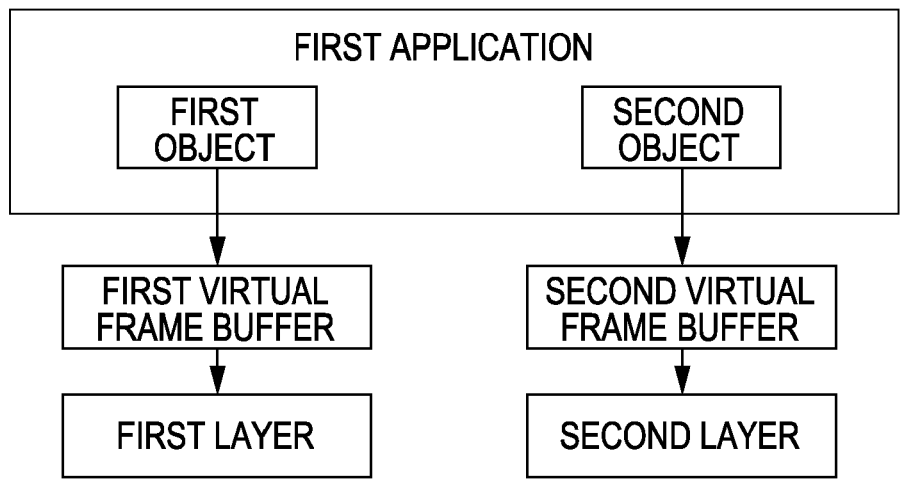
FIG. 4 shows an example of the correlation between applications and layers and a table stored in the storage section 170.
Figure 5:
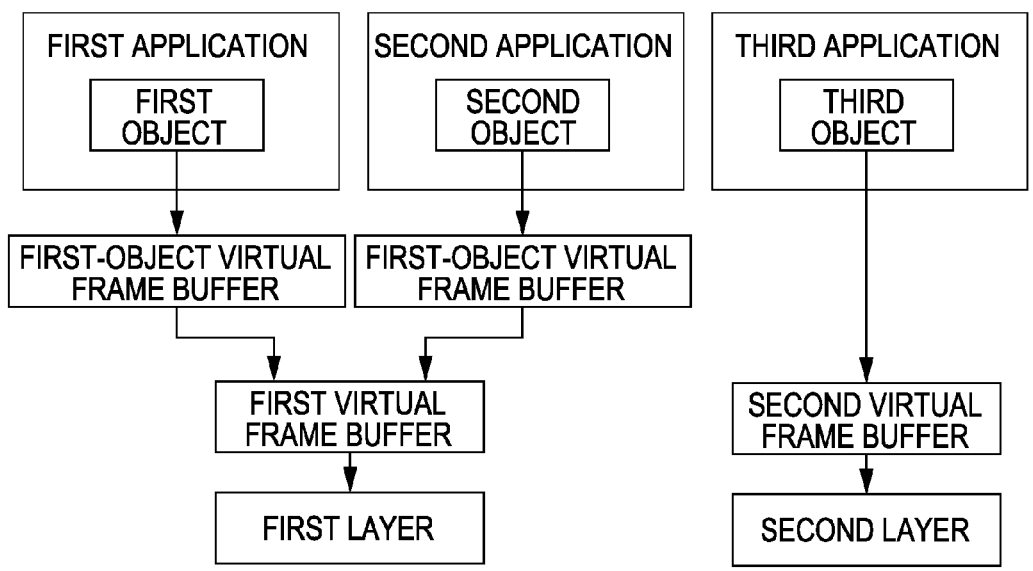
FIG. 5 shows an example of the correlation between applications and layers and a table stored in the storage section 170.

Referring now to FIGS. 3 to 5, in connection with the determination on the destination of the request, the correlation between the applications and the layers and information to be stored in the storage section 170 will be described in more detail. Virtual frame buffers and layers are always in one-to-one correspondence. FIG. 3(a) shows an example of the one-to-one correspondence of applications and layers. A first application contains a first object and a second object. A first virtual frame buffer stores the image information of the two objects. A second application contains a third object. A second virtual frame buffer stores the image information of the third object. In the case where applications and layers are in one-to-one correspondence, the destination of the request may be either an application or a layer.

To determine an application as the request destination, the destination determining section 155 has only to know the correlation between the layers and the applications. In this case, an application determines an object to which the request is to be sent according to the positional information contained in the request designated by the user. On the other hand, to determine an object as the request destination, the destination determining section 155 needs to know not only the correlation between the layers and the objects but also the positions of the objects. Therefore, with a structure in which the destination determining section 155 determines an object as the destination, the table as shown in FIG. 3(b) is stored in the storage section 170.

FIG. 4(a) shows an example of a case in which a plurality of objects contained in one application correspond to layers in a one-to-one relationship. A first application contains a first object and a second object. The image information of the first object is stored in a first virtual frame buffer, and the image information of the second object is stored in a second virtual frame buffer.

In this case, the request destination determined by the destination determining section 155 needs to be an object, because there is a possibility that the first object and the second object are partially superposed on the screen. Accordingly, in the case shown in FIG. 4(a), the table as shown in FIG. 4(b) is stored in the storage section 170.

FIG. 5(a) shows an example of a case in which one layer corresponds to a plurality of applications. A first application contains a first object. The image information of the first object is stored in a first-object virtual frame buffer. A second application contains a second object. The image information of the second object is stored in a second-object virtual frame buffer. The contents of the first-object virtual frame buffer and the second-object virtual frame buffer are duplicated in a first virtual frame buffer.

In this case, the destination determining section 155 cannot determine to which application or object the request should be sent, because one layer corresponds to a plurality of applications or objects. Therefore, the destination determining section 155 needs to know not only the correlation between the layers and the application but also the positions of the objects. Accordingly, in the case shown in FIG. 5(a), the table as shown in FIG. 5(b) is stored in the storage section 170. The destination determining section 155 itself may determine the threshold alpha values, like the application managing section 115.

Thus, according to embodiments of the invention, a threshold alpha value serving as a reference in determining a request destination is prepared for each layer; thus, it is determined from the threshold alpha value of each layer itself whether the layer is suitable for the request determination. Thus, the display system 100 can process regions of the same alpha value as regions to receive the request or regions not to receive the request.

Figure 6:
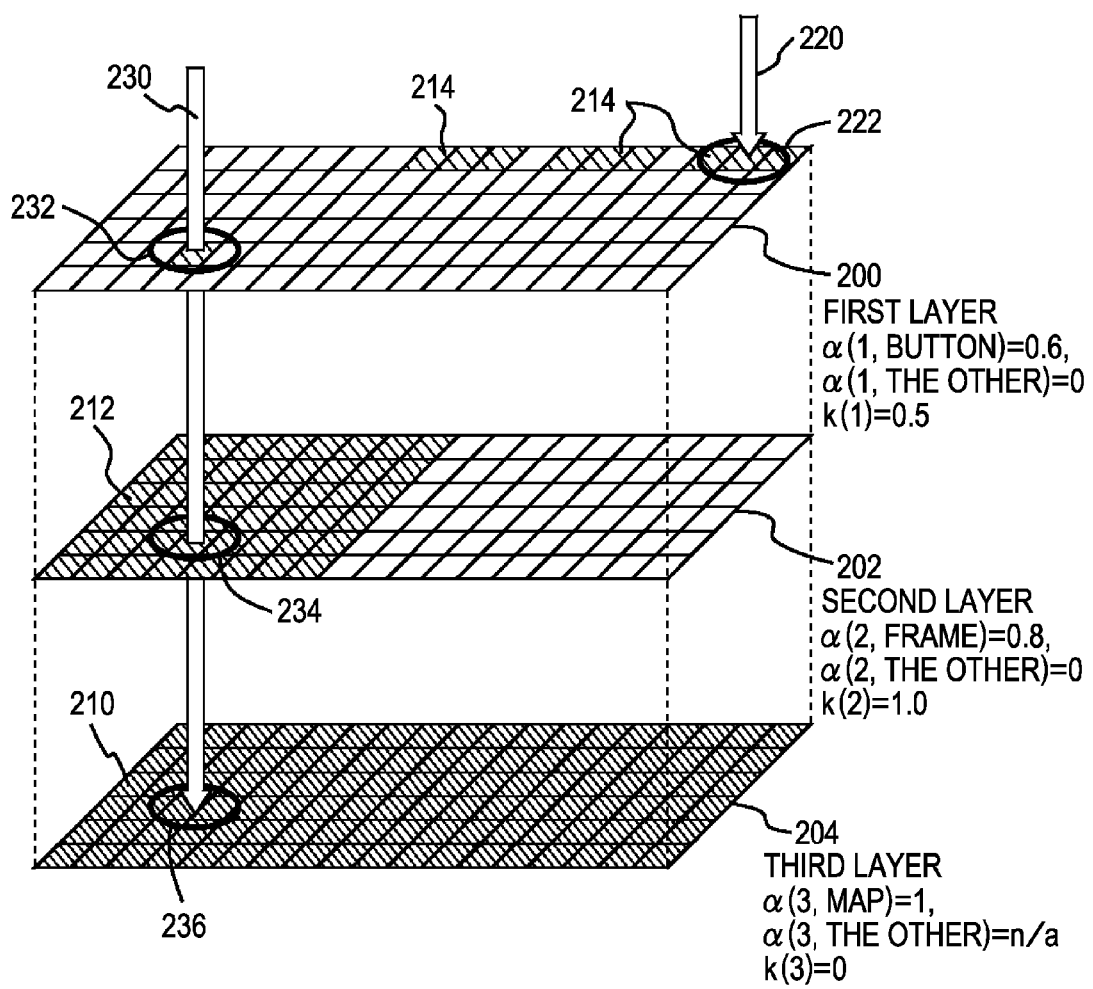
FIG. 6 shows the layer structure of a three-layer image that incorporates a method for determining a request destination of the invention.
Figure 7:
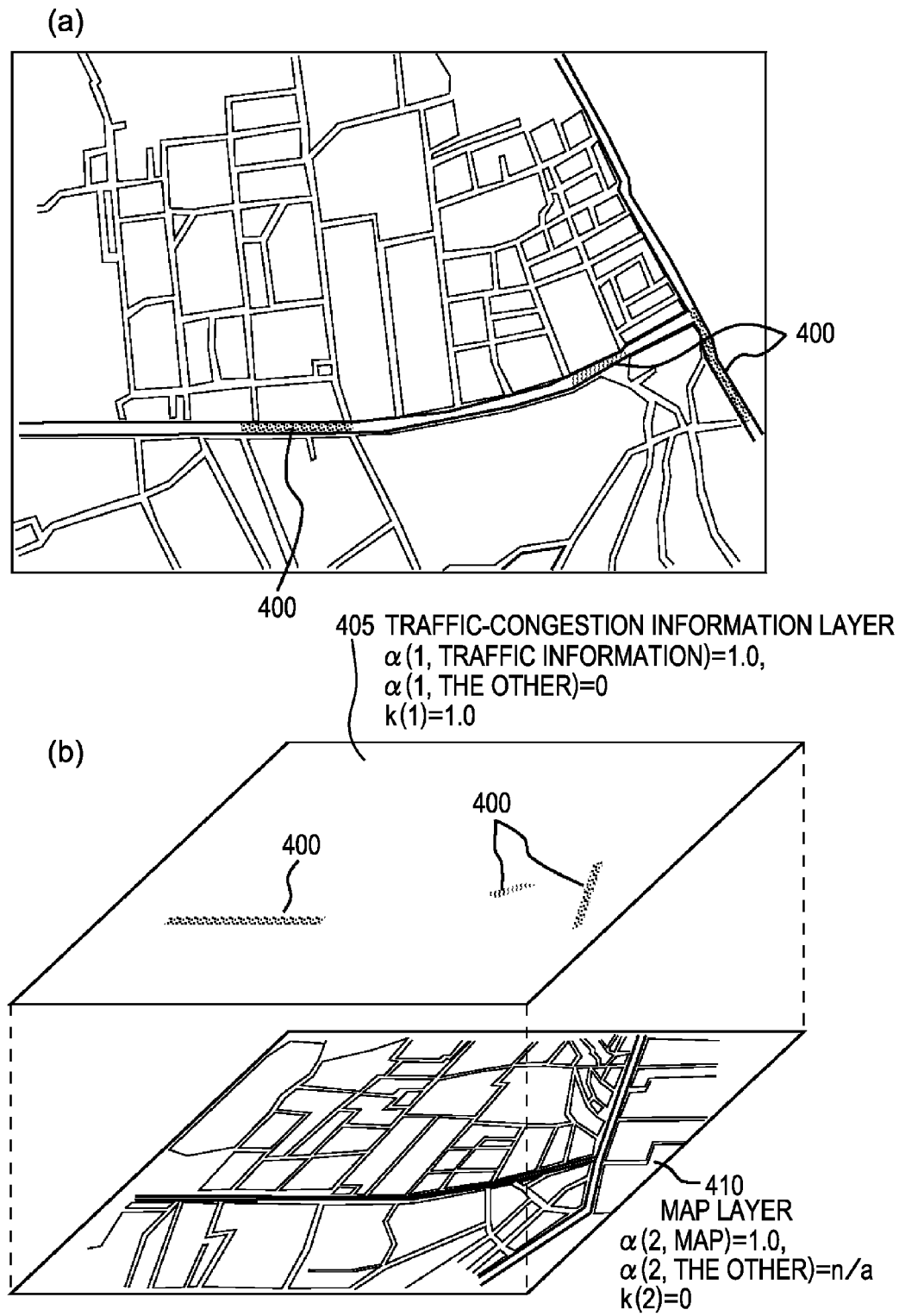
FIG. 7(a) shows an example of a two-layer image to which the maximum alpha value is to be set as the threshold alpha value.
FIG. 7(b) shows the layer structure of the image shown in FIG. 7(a).
Figure 8:
FIG. 8(a) shows an example of a two-layer image to which the maximum alpha value is to be set as the threshold alpha value.
FIG. 8(b) shows the layer structure of the image shown in FIG. 8(a).

Referring then to FIGS. 6 to 8, a method for determining the destination of a process request according to embodiments of the invention will be specifically described. FIG. 6 shows a method for determining a request destination in a display system for displaying a three-layer image. As shown in FIG. 6, the image has three layers of a first layer 200, a second layer 202, and a third layer 204. The layers have buttons 214, a frame 212, and a map 210, respectively, in order from the highest layer. Let the alpha value of the regions of the buttons 214 of the first layer 200 be 0.6, the alpha value of the other region of the first layer 200 be 0, and the threshold alpha value of the first layer 200 be 0.5.

Let the alpha value of the region of the frame 212 of the second layer 202 be 0.8, the alpha value of the other region of the second layer 202 be 0, and the threshold alpha value of the second layer 202 be 1.0. Let the alpha value of the region of the map 210 of the third layer 204 be 1.0 and the threshold alpha value of the third layer 204 be 0.

Suppose that a position 222 at which the button 214 is disposed is pointed to (illustrated by arrow 220) by the user using the input section 165 in that situation. Then, the destination determining section 155 searches for the destination in order from the highest first layer 200. That is, the destination determining section 155 compares the alpha value 0.6 at the position 222 on the first layer 200 with the threshold alpha value 0.5 of the first layer 200 to determine whether the alpha value at the position 222 is higher or not.

In this case, the alpha value at the position 222 is higher. Therefore, the destination determining section 155 determines an application related to the first layer 200 or the object of the button 214 contained in the application as the destination of the request. In this way, if the threshold alpha value is set at the central value of the possible alpha values, regions that are drawn clearly to some extent can receive event information.

Suppose that positions 232, 234, and 236 at which the frame 212 is located are pointed to (illustrated by arrow 230) by the user using the input section 165. Then, the destination determining section 155 searches for the destination in order from the highest first layer 200. In other words, the destination determining section 155 compares the alpha value 0 at the position 232 on the first layer 200 with the threshold alpha value 0.5 of the first layer 200 to determine whether the alpha value at the position 232 is higher or not. In this case, the threshold alpha value at the position 232 is higher. Therefore, the destination determining section 155 starts searching the second layer 202.

The destination determining section 155 compares the alpha value 0.8 at the position 234 on the second layer 202 with the threshold alpha value 1.0 of the second layer 202 to determine whether the alpha value at the position 234 is higher or not. In this case, the threshold alpha value at the position 234 is higher. Therefore, the destination determining section 155 starts searching the third layer 204. In this way, if the threshold alpha value is set at the possible highest value, any region of the layer cannot receive event information irrespective of their alpha values. Therefore, it is preferable to set the highest alpha value as the threshold value for layers to which no request should be sent.

The destination determining section 155 compares the alpha value 1.0 at the position 236 on the third layer 204 with the threshold alpha value 0 of the third layer 204 to determine whether the alpha value at the position 236 is higher or not. In this case, the alpha value at the position 236 is higher. Therefore, the destination determining section 155 determines an application related to the third layer 206 or an object contained in the application as the destination of the request. If the threshold alpha value is set at the possible lowest value, any drawn region of the layer can receive event information. Accordingly, it is preferable to set the lowest alpha value as the threshold value for a layer, such as the lowest layer, that is finally searched for destination and that surely receives the event.

FIG. 7 shows a first case in which it is desirable to set the highest alpha value as the threshold value.

FIG. 7(a) shows the display screen of a car-mounted car navigation system. The display screen displays a map, in which marked portions 400 indicate that the roads at the positions are congested. The car navigation system receives traffic information such as traffic-congestion information and traffic control information from its communication section and displays them on map information in layers.

FIG. 7(b) shows the layer structure of the image shown in FIG. 7(a). The image includes a congestion information layer 405 showing congestion information and a map layer 410 showing map information. Here, the region of the congestion information layer 405 on which congestion information is drawn is set at an alpha value 1.0, while the other region is set at an alpha value 0. The map layer 410 has map information all over the area, to which an alpha value 1.0 is set.

In the case where in which congestion information is clearly displayed on map information as described above, a desirable action when the user points a specific position on the screen and requests processing is remapping. To achieve the action, the event of user input must be sent to a map application associated with the map layer 410. A congestion information application associated with the congestion information layer 405 receives a message from the map application and redraws the congestion information corresponding to the redrawn map.

Thus, it is preferable to set the highest alpha value 1 as the threshold value for the congestion information layer 405 so that no request is directly sent thereto. On the other hand, it is preferable to set the lowest alpha value 0 as the threshold value for the map layer 410 so that a request is surely sent thereto.

FIG. 8 shows a second case in which it is desirable to set the highest alpha value as the threshold value.

FIG. 8(a) shows the display screen of a car-mounted car navigation system. The display screen displays a map, on which character information such as a current driving speed and a distance to the goal is displayed. The car navigation system is configured to register the goal first. Some navigation systems can display additional information such as the remaining distance to the goal.

FIG. 8(b) shows the layer structure of the image shown in FIG. 8(a). The image includes a character information layer 505 showing character information and a map layer 510 showing map information. Here, the region 500 of the character information layer 505 on which character information is drawn is set at an alpha value 1.0, while the other region is set at an alpha value 0. The map layer 510 has map information all over the area, to which an alpha value 1.0 is set.

In the case where in which character information is clearly superposed on map information as described above, a desirable action when the user points a specific position on the screen and requests processing is remapping; for example, remapping for enlarged display of a position pointed by the user. To achieve the action, the event of user input must be sent to a map application associated with the map layer 510.

Thus, it is preferable to set the highest alpha value 1 as the threshold value for the character information layer 505 so that no request is sent thereto. On the other hand, it is preferable to set the lowest alpha value 0 as the threshold value for the map layer 510 so that a request is surely sent thereto.

Figure 9:
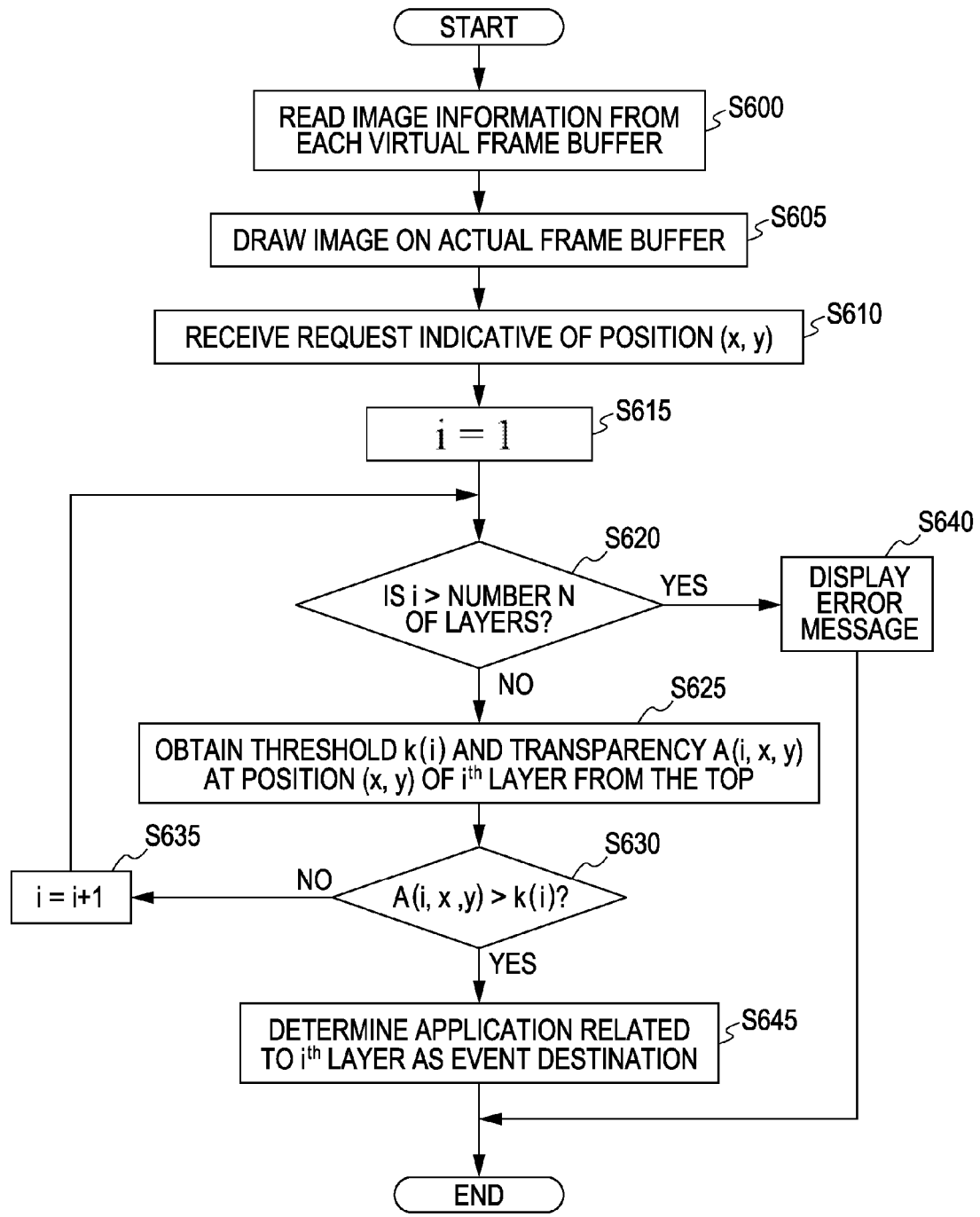
FIG. 9 shows a flowchart for the process of determining a request destination according to an embodiment of the invention.

Referring then to the flowchart of FIG. 9, the operation of the display system 100 according to the embodiment will be described. The operation is started at Step 600, at which the destination determining section 155 reads a plurality of image information including the drawing information and transparency information of the points on the screen which are obtained by one or more applications from the virtual frame buffers 125, 130, and 135. Then, the destination determining section 155 pastes the image information read from the virtual frame buffers 125, 130, and 135 to corresponding layers and executes alphablending according to the respective transparency information to generate a multilayer image in the actual frame buffer 140, and draws the image on the screen of the display section 160 (Step 605).

When the destination determining section 155 receives a notification from the detecting section 120 that a position (x, y) on the screen of the display section 160 is pointed by the user with the input section 165 and a process request is given (Step 610), the destination determining section 155 substitutes 1 for a variable i indicative of a search target layer (Step 615). The destination determining section 155 then determines whether the variable i is larger than the number N of layers (Step 620). If a negative determination is made in Step 620, the process proceeds to Step 625, wherein the destination determining section 155 obtains a threshold alpha value k(i) set for the ith layer from the top and the alpha value A (i, x, y) at the pointed position (x, y) in the virtual frame buffer corresponding to the ith layer. Then, the destination determining section 155 determines whether the alpha value A (i, x, y) is larger than k(i) (Step 630).

If A (i, x, y) is smaller than k(i) (Step 630: No), the destination determining section 155 increases the variable i by one to start searching the next layer for a destination (Step 635). After Step 635, the process returns to Step 620. If a positive determination is made in Step 620, that is, if the variable i is larger than the number N of the layers, which indicates that a layer to which the request is to be sent is not present, the destination determining section 155 displays an error message on the screen (Step 640), and the process is completed.

On the other hand, if a positive determination is made in Step 630, that is, if A (i, x, y) is larger than k(i), the destination determining section 155 determines an application associated with the ith layer or an object contained in the application and disposed at the position (x, y) as the destination of the request (Step 645), and the process is completed.

Figure 10:
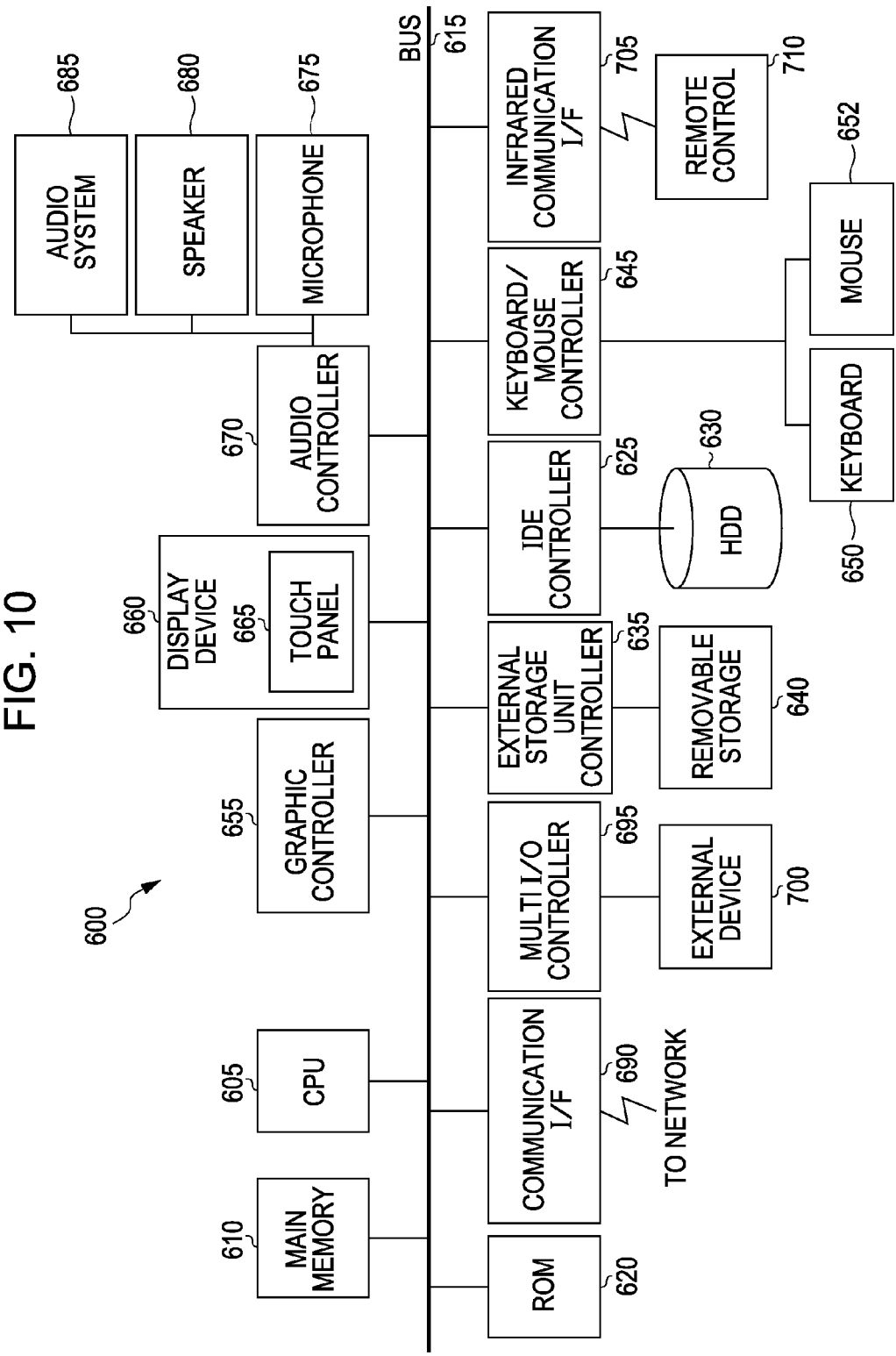
FIG. 10 shows a typical hardware structure of a computer system according to an embodiment of the invention.

FIG. 10 shows a typical hardware structure of a computer system usable in embodiments of the invention. The computer system 600 includes a central processing unit (CPU) 605 and a main memory 610. The CPU 605 and the main memory 610 are connected to a hard disk drive 630 serving as an auxiliary storage unit via a bus 615. The hard disk drive 630 is connected to the bus 615 via an IDE controller 625. A removable storage (an external recoding-media exchangeable storage system) 640 such as a DVD drive is connected to the bus 615 via an external storage unit controller 635.

The removable storage 640 is loaded with a recording medium. The recording medium, the hard disk drive 630, and the ROM 620 can hold computer usable program code for providing instructions to the CPU or the like in cooperation with the operating system to execute the invention. The recorded computer usable program code is loaded in the main memory 610 and executed by the CPU 605. The computer program can be compressed or divided into multiple pieces and stored in multiple media.

The computer system 600 may further include user interface hardware such as a keyboard 650, a mouse 652, a touch panel 665, and a display device 660 for displaying visual data for the user. The keyboard 650 and mouse 652 are connected to the bus 615 via a keyboard/mouse controller 645. A graphic controller 655 acquires image data that the CPU 605 generates on the frame buffer in the main memory 610 and displays it on the display device 660. As an alternative, the graphic controller 655 may accommodate the frame buffer for shoring the image data generated by the CPU 605. As a further alternative, the CPU 605 may have the function of the graphic controller 655. The computer system 600 may include an infrared interface 705 so that the user can provide instructions to the computer system 600 via the infrared interface 705 using a remote control 710.

The computer system 600 may connect to a network by wire or radio via a communication interface 690 (e.g., an Ethernet® card, a token-ring card, etc.) to communicate with other computers or the like. Moreover, if the computer system 600 is a car-mounted navigation system, the computer system 600 may connect to and control an external device 700 such as an air conditioner via a multi input/output controller 695.

A speaker 680 receives an audio signal converted from digital to analog by an audio controller 670 and outputs the audio signal as sound. The audio controller 670 converts audio information received from a microphone 675 from analog to digital to allow the audio information outside the system to be taken into the system. If the computer system 600 is a car-mounted navigation system, the audio controller 670 may also connect to an audio system 685.

It will be obvious to those skilled in the art that various modifications may be made and that the functions of the hardware components of the computer system for use in the embodiment of the invention are distributed to a plurality of machines and embodied without departing from the spirit and scope of the invention.

The invention can be achieved as hardware, software, or a combination of hardware and software. Typical execution by a combination of hardware and software is execution in a computer system having a predetermined program. In this case, the predetermined program is loaded in the computer system and executed so that the program can control the computer system and execute the process according to the invention. The program includes an instruction group which can be expressed by any language, code, or notation. The instruction group enables the system to execute a specific function directly or after one or both of (1) Conversion to another language, code, or notation and (2) Duplication to another medium is executed. It is needless to say that the invention includes not only the program itself but also a medium that holds the program. The program for executing the functions of the invention may be stored in any computer-readable recording medium such as a floppy disk, MO, CD-ROM, DVD, hard disk drive, ROM, MRAM, and RAM. The program can be downloaded from another computer system connected via a communication line to be stored in a recording medium or can be duplicated from another recording medium. The program may be compressed or divided into a plurality of pieces and stored in a single or a plurality of recording media.

Although the invention has been described with reference to an embodiment, the technical scope of the invention is not limited to that described in the foregoing embodiment. It is obvious to those skilled in the art that various changes or modifications may be made therein. Accordingly, any and all modifications, variations, or equivalent arrangements should be considered to be within the technical scope of the invention.

That which is claimed:

1. A system having a display section, for displaying images on a display screen by computer processing, the system comprising:
   a plurality of first buffers each storing a plurality of pieces of image information generated by one or more applications, the image information including drawing information and transparency information of points on the display screen of the display section;

a drawing section for drawing a multilayer image on the display screen by alphablending the image information in each of the first buffers according to the respective transparency information and by superposing the image information;
a storage section for storing a threshold transparency of each layer;
an input section for receiving positional information indicative of a position on the display screen from a user as a process request; and
a destination determining section for (1) determining, in response to reception of the positional information, whether the transparency information at the position indicated by the positional information and in the first buffer corresponding to each of the plurality of layers is larger than the corresponding threshold value of each layer, and (2) determining a destination of the process request, wherein the destination of the process request is determined to be (i) an application related to a layer for which a positive determination that the transparency information at the position indicated by the positional information is larger than the corresponding threshold value is made or (ii) an object contained in the determined application and located in said position on the display screen.

2. The system according to claim 1, wherein the system further comprises a second buffer for storing image information of the multilayer image to be displayed on the display screen of the display section, and wherein the drawing section generates the multilayer image into the second buffer and draws the multilayer image on the display screen by pasting the image information of the plurality of first buffers to corresponding layers and executing alphablending according to the respective transparency information.

3. The system according to claim 1, wherein the destination determining section executes determination in order from the highest layer, and determines, as the destination of the request, an application related to a layer for which a positive determination is made first or an object contained in the application and located in said position on the display screen.

4. The system according to claim 1, wherein a layer to which no request should be sent has a maximum transparency as the threshold transparency of the layer.

5. The system according to claim 4, wherein the layer to which no request should be sent is a layer to which text information is to be drawn.

6. The system according to claim 4, wherein the layer to which no request should be sent is a layer to which traffic information is to be drawn.

7. The system according to claim 1, further comprising an executing section for executing the one or more applications, wherein the destination determining section receives the respective threshold transparencies from the one or more applications or one or more objects contained in the applications, and stores the received threshold transparencies in the storage section in association with the corresponding layers.

8. The system according to claim 1, further comprising an executing section for executing the one or more applications and an application managing section for managing the one or more applications, wherein the application managing section determines the threshold transparencies of the layers and stores the threshold transparencies in the storage section.

9. A car navigation system having a display section, for displaying images on a display screen by computer processing, the system comprising:
a second buffer for storing image information of a multilayer image to be displayed on the display screen of the display section;
a receiving section for receiving information;
an executing section for executing one or more applications that provide map information and traffic congestion information based on the information received by the receiving section;
a plurality of first buffers each storing a plurality of pieces of image information generated by the one or more applications, the image information including drawing information and transparency information of points on the display screen;
a drawing section for generating the multilayer image into the second buffer and drawing the multilayer image on the display screen by pasting the image information in the plurality of first buffers to corresponding layers and alphablending the image information according to the respective transparency information;
a storage section for storing a threshold transparency of each layer;
an input section for receiving positional information indicative of a position on the display screen from the user as a process request; and
a destination determining section for (1) determining, in response to reception of the positional information, whether the transparency information at the position indicated by the positional information and in the first buffer corresponding to each of the plurality of layers is larger than the corresponding threshold value of each layer, and (2) determining a destination of the process request, wherein the destination of the process request is determined to be (i) an application related to a layer for which a positive determination that the transparency information at the position indicated by the positional information is larger than the corresponding threshold value is made or (ii) an object contained in the determined application and located in said position on the display screen.

10. A computer program product for a system for displaying a multilayer image on a display screen, the system having a plurality of first buffers, the computer program product having computer usable program code for determining the destination of a request, the computer program product comprising:
computer usable program code for reading a plurality of pieces of image information generated by one or more applications from the plurality of first buffers, the image information including drawing information and transparency information of points on the display screen;
computer usable program code for displaying the multilayer image on the screen by alphablending the image information read from each of the first buffers according to the respective transparency information and by superposing the image information;
computer usable program code for receiving positional information indicative of a position on the display screen as a process request from the user via an input section; and
computer usable program code for (1) determining, in response to the reception of the positional information, whether the transparency information at the position indicated by the positional information and in the first buffer corresponding to each of the layers is larger than a corresponding threshold value of each layer with reference to a threshold transparency set for each layer, and (2) determining a destination of the process request, wherein the destination of the process request is determined to be (i) an application related to a layer for which a positive determination that the transparency information at the position indicated by the positional information is larger than the corresponding threshold value is made or (ii) an object contained in the determined application and located in said position.

11. The computer program product according to claim 10, further comprising:
- computer usable program code for storing, to a second buffer, image information of the multilayer image to be displayed on the display screen of the display section;
- wherein the computer usable program code for displaying the multilayer image on the screen generates the multilayer image into the second buffer and draws the multilayer image on the display screen by pasting the image information of the plurality of first buffers to corresponding layers and executing alphablending according to the respective transparency information.

12. The computer program product according to claim 10, wherein the computer usable program code for determining executes determination in order from the highest layer, and determines, as the destination of the request, an application related to a layer for which a positive determination is made first or an object contained in the application and located in said position on the display screen.

13. The computer program product according to claim 10, wherein a layer to which no request should be sent has a maximum transparency as the threshold transparency of the layer.

14. The computer program product according to claim 13, wherein the layer to which no request should be sent is a layer to which text information is to be drawn.

15. The computer program product according to claim 13, wherein the layer to which no request should be sent is a layer to which traffic information is to be drawn.

16. The computer program product according to claim 10, further comprising:
- computer usable program code for executing the one or more applications;
- wherein the computer usable program code for determining receives the respective threshold transparencies from the one or more applications or one or more objects contained in the applications, and stores the received threshold transparencies in a storage section in association with the corresponding layers.

17. The computer program product according to claim 10, further comprising:
- computer usable program code for executing the one or more applications; and
- computer usable program code for managing the one or more applications;
- wherein the computer usable program code for managing determines the threshold transparencies of the layers and stores the threshold transparencies in the storage section.

18. A method for determining the destination of a request in a system for displaying a multilayer image on a display screen, the system having a plurality of first buffers, the method comprising the steps of:
- reading a plurality of pieces of image information generated by one or more applications from the plurality of first buffers, the image information including drawing information and transparency information of points on the display screen;
- displaying the multilayer image on the screen by alphablending the image information read from each of the first buffers according to the respective transparency information and by superposing the image information;
- receiving positional information indicative of a position on the display screen as a process request from the user via an input section; and
- determining, in response to the reception of the positional information, whether the transparency information at the position indicated by the positional information and in the first buffer corresponding to each of the layers is larger than a corresponding threshold value of each layer with reference to a threshold transparency set for each layer, and determining a destination of the process request, wherein the destination of the process request is determined to be (i) an application related to a layer for which a positive determination that the transparency information at the position indicated by the positional information is larger than the corresponding threshold value is made or (ii) an object contained in the determined application and located in said position.

19. The method according to claim 18, further comprising:
- storing, to a second buffer, image information of the multilayer image to be displayed on the display screen of the display section;
- wherein displaying the multilayer image on the screen generates the multilayer image into the second buffer and draws the multilayer image on the display screen by pasting the image information of the plurality of first buffers to corresponding layers and executing alphablending according to the respective transparency information.

20. The method according to claim 18, wherein determining, in response to the reception of the positional information, whether the transparency information at the position indicated by the positional information and in the first buffer corresponding to each of the layers is larger than a threshold value of each layer with reference to a threshold transparency set for each layer is executed in order from the highest layer, and
- wherein determining, as the destination of the request, an application related to a layer for which a positive determination is made or an object contained in the application and located in said position comprises determining, as the destination of the request, an application related to a layer for which a positive determination is made first or an object contained in the application and located in said position on the display screen.

21. The method according to claim 18, wherein a layer to which no request should be sent has a maximum transparency as the threshold transparency of the layer.

22. The method according to claim 21, wherein the layer to which no request should be sent is a layer to which text information is to be drawn.

23. The method according to claim 21, wherein the layer to which no request should be sent is a layer to which traffic information is to be drawn.

24. The method according to claim 18, further comprising:
- executing the one or more applications;
- receiving the respective threshold transparencies from the one or more applications or one or more objects contained in the applications; and
- storing the received threshold transparencies in a storage section in association with the corresponding layers.

25. The method according to claim 18, further comprising:
- executing the one or more applications; and
- managing the one or more applications;
- wherein managing the one or more applications comprises determining the threshold transparencies of the layers and stores the threshold transparencies in a storage section.

* * * * *